(12) United States Patent
Baeck et al.

(10) Patent No.: US 10,985,396 B2
(45) Date of Patent: Apr. 20, 2021

(54) FUEL CELL STACK PRESSURIZED BY PRESS FORKS AND ASSEMBLY METHOD OF THE SAME

(71) Applicants: Hyundai Motor Company, Seoul (KR); Kia Motors Corporation, Seoul (KR)

(72) Inventors: Suk Min Baeck, Gyeonggi-do (KR); Young Bum Kum, Seoul (KR); Kwi Seong Jeong, Gyeonggi-do (KR)

(73) Assignees: Hyundai Motor Company, Seoul (KR); Kia Motors Corporation, Seoul (KR)

(*) Notice: Subject to any disclaimer, the term of this patent is extended or adjusted under 35 U.S.C. 154(b) by 91 days.

(21) Appl. No.: 16/012,947

(22) Filed: Jun. 20, 2018

(65) Prior Publication Data

US 2019/0181485 A1 Jun. 13, 2019

(30) Foreign Application Priority Data

Dec. 11, 2017 (KR) .................. 10-2017-0169269

(51) Int. Cl.
| | |
|---|---|
| *H01M 8/2475* | (2016.01) |
| *H01M 8/248* | (2016.01) |
| *H01M 8/2404* | (2016.01) |
| *H01M 8/0202* | (2016.01) |
| *H01M 8/1018* | (2016.01) |

(52) U.S. Cl.
CPC ....... *H01M 8/2475* (2013.01); *H01M 8/0202* (2013.01); *H01M 8/2404* (2016.02); *H01M 8/248* (2013.01); *H01M 2008/1095* (2013.01); *H01M 2250/20* (2013.01)

(58) Field of Classification Search
CPC ............. H01M 8/2475; H01M 8/2404; H01M 8/0202; H01M 8/248
USPC ........................................................ 429/469
See application file for complete search history.

(56) References Cited

U.S. PATENT DOCUMENTS

| | | | |
|---|---|---|---|
| 9,559,378 B2 | 1/2017 | Takeyama | |
| 2006/0093890 A1* | 5/2006 | Steinbroner | H01M 8/248 429/430 |
| 2009/0004533 A1* | 1/2009 | Tanaka | H01M 8/2475 429/481 |
| 2014/0147769 A1* | 5/2014 | Takeyama | H01M 8/248 429/469 |

(Continued)

FOREIGN PATENT DOCUMENTS

| | | | |
|---|---|---|---|
| JP | 07249426 A | * | 9/1995 |
| JP | H10189025 A | | 7/1998 |
| JP | 2005071869 A | * | 3/2005 |

(Continued)

OTHER PUBLICATIONS

"Weir." Merriam-Webster.com Dictionary, Merriam-Webster, https://www.merriam-webster.com/dictionary/weir. Accessed Feb. 12, 2020. (Year: 2020).*

*Primary Examiner* — Sean P Cullen
(74) *Attorney, Agent, or Firm* — Mintz Levin Cohn Ferris Glovsky and Popeo, P.C.; Peter F. Corless

(57) ABSTRACT

A fuel cell stack is provided and includes a fuel cell assembly in which a plurality of fuel cells are stacked between upper and lower current collectors. The fuel cell stack includes an enclosure that pressurizes and seals the fuel cell assembly in a stacked direction of the fuel cells.

8 Claims, 9 Drawing Sheets

(56) References Cited

U.S. PATENT DOCUMENTS

| | | | | |
|---|---|---|---|---|
| 2014/0356753 A1* | 12/2014 | Guenthart | ............ | H01M 8/247 |
| | | | | 429/469 |
| 2016/0254563 A1* | 9/2016 | Sato | ...................... | H01M 8/248 |
| | | | | 429/469 |

FOREIGN PATENT DOCUMENTS

| | | | |
|---|---|---|---|
| JP | 2016091831 A | 5/2016 | |
| KR | 100875579 B1 | 12/2008 | |

* cited by examiner

FUEL CELL STACK PRESSURIZED BY PRESS FORKS AND ASSEMBLY METHOD OF THE SAME

CROSS-REFERENCE TO RELATED APPLICATION

This application claims priority to and the benefit of Korean Patent Application No. 10-2017-0169269 filed on Dec. 11, 2017, the entire contents of which are incorporated herein by reference.

BACKGROUND

(a) Field of the Invention

The present invention relates to a fuel cell stack, and more particularly, to a fuel cell stack for sealing and protecting the fuel cells using an enclosure.

(b) Description of the Related Art

As is known, a fuel cell stack is a type of power generating device which generates electric energy through an electrochemical reaction between hydrogen and oxygen by fuel cells, and is applied to, for example, a fuel cell vehicle. The fuel cell stack is formed by an electricity generating assembly, in which fuel cells (unit cells) in a unit of several hundred are continuously arranged. The fuel cell has a configuration in which separating plates are disposed at both sides of a membrane electrode assembly (MEA) with the MEA interposed therebetween. The fuel cells may be coupled by an end plate and a fastening mechanism in a pressurized state.

The aforementioned fuel cell stack may be manufactured as a module form by a process of stacking fuel cells one by one, pressurizing the stacked fuel cells with a press while the fuel cells are disposed between upper and lower end plates, and fastening the end plate using the fastening mechanism. Further, the fuel cell stack may be assembled by sealing the stack module fastened the fuel cells through the end plate and the fastening mechanism by the enclosure.

In particular, in a conventional art of stack module assembling, when the fuel cells which are stacked between end plates are pressurized by a press, the fastening band is assembled to the upper and lower end plates by a bolt or by a bolt rod and a nut. Further, the end plates perform inlet and outlet function of pressurizing/insulation and reaction gas/coolant of the fuel cells which are repeatedly stacked at both end positions of the fuel cells. However, in the conventional art, the stack module is assembled using the end plates and the fastening mechanism and to the enclosure, therefore, assembly processes and assembly components thereof increase.

The above information disclosed in this section is merely for enhancement of understanding of the background of the invention and therefore it may contain information that does not form the prior art that is already known in this country to a person of ordinary skill in the art.

SUMMARY

The present invention provides a fuel cell stack and assembly method of the same for reducing assembly processes and assembly components by pressurizing and combining fuel cells using an enclosure that protects the fuel cells.

A fuel cell stack may include a fuel cell assembly in which a plurality of fuel cells are stacked between upper and lower current collectors, and an enclosure that pressurizes and seals the fuel cell assembly in a stacked direction of the fuel cells. Further, in the fuel cell stack according to an exemplary embodiment of the present invention, the enclosure may include a housing in which one surface is open and the remaining surfaces are closed, and a cover that closes the open end of the housing.

Further, in the fuel cell stack according to an exemplary embodiment of the present invention, the fuel cell assembly may be inserted into the housing through the opening end in a surface direction vertical to the stacked direction of the fuel cells. Both side plates of the housing may support a pressurizing reaction force of the fuel cell assembly and the fuel cell assembly may be inserted into the housing when pressurized by a press fork.

In addition, a fork guide unit that allows the release of pressure and extraction to outside of the press fork may be disposed at inside surface of the both side plates. The housing may include both side plates of a first direction that supports the current collectors by both side surfaces of the fuel cell assembly and supports a pressurizing reaction force of the fuel cell assembly, both side plates of a second direction connected with the both side plates of the first direction and supporting the other both side surfaces of the fuel cell assembly, and a base plate connected with the both side plates of the first direction and the both side plates of the second direction and supporting a surface of an insertion direction of the fuel cell assembly.

In the fuel cell stack according to an exemplary embodiment of the present invention, both side plates of the first direction may include an inside supporting surface that supports the current collector to which a pressurizing reaction force of the fuel cell assembly is applied, and a plurality of fork grooves formed at the inside supporting surface to be connected from an opening end to a closing end of the housing along the insertion direction of the fuel cell assembly. The fork groove may be formed such that the press fork formed as one arm cantilever shape pressurizing the current collector in both sides is able to be inserted into the inside of the housing in the stacked direction of the fuel cells.

Additionally, the fork groove may be formed to have a greater depth than a thickness of the press fork. A current collector terminal may be installed at the current collector. A terminal groove parallel to the fork groove and into which the current collector terminal is able to be inserted may be formed at the inside supporting surface.

Further, a fuel cell stack according to an exemplary embodiment of the present invention may include an enclosure having a housing and a cover which are combined with each other, and a fuel cell assembly in which a plurality of stacked fuel cells are pressurized by a predetermined pressure along a stacked direction by the housing in the housing. The cover may close inside of the housing and the housing may support a pressurizing reaction force of the fuel cell assembly in a vertical direction to the closing direction of the cover. The housing may also have an opening end to which the cover is combined.

The fuel cell assembly may be inserted into the housing in a vertical surface direction to the stacked direction of the fuel cells through the opening end when the fuel cell assembly is pressurized by a press fork along the stacked direction of the fuel cells. The housing may include both side plates that support a pressurizing reaction force of the fuel cell assembly. Additionally, a plurality of fork grooves that allow for the release of pressure and extraction to outside of the press force may be disposed inside surface of the both side plates. In particular, each fork groove may be formed to be connected from an opening end to a closing end of the housing along an insertion direction of the fuel cell assembly. The press fork formed as one arm cantilever shape pressurizing the fuel cell assembly may be formed to be inserted into the inside of the housing in the stacked direction of the fuel cells.

Further, an assembly method of a fuel cell stack according to an exemplary embodiment of the present invention may include providing a housing of which one surface is open and the remaining surfaces are closed and a cover coupled to an opening end of the housing, stacking fuel cells between current collectors of both sides surfaces of the fuel cell assembly, and pressurizing the current collectors by a press fork along a stacked direction of the fuel cells at the both sides, and inserting the current collector and the fuel cell assembly of the fuel cells pressurized by the press fork into the housing through the opening end in a vertical direction to the stacked direction of the fuel cells.

Further, the method according to an exemplary embodiment of the present invention may further include releasing pressure of the press fork, inserting the press fork into a fork groove of the inside surface of the housing in a stacked direction of the fuel cells, and extracting the press fork to an outside of the housing through the fork groove. The fork groove may have a greater depth than a thickness of the press fork and may be formed at an inside surface that corresponds to the current collector. The press fork may be configured to pressurize the current collector by a greater pressurizing force than a predetermined pressurizing force of the fuel cell assembly. Additionally, a portion of thickness or an entire of thickness of the press fork may be inserted into the fork groove along an insertion direction of the fuel cell assembly. In the releasing of pressure of the press fork, the inside surface of the housing may support the pressurizing reaction force of the fuel cell assembly and the opening end of the housing may be closed by the cover.

Further, in the method according to an exemplary embodiment of the present invention, the inside surface of the housing may support the pressurizing reaction force of the fuel cell assembly in a vertical direction to the closing direction of the cover. The fuel cell assembly may be pressurized and combined by a predetermined pressurizing force using an enclosure that seals the fuel cell assembly, therefore, fasteners for pressurizing and fastening the fuel cells such as an end plate, a fastening band, a bolt rod and a nut may be omitted.

Accordingly, in an exemplary embodiment of the present invention, the entire assembly processes for manufacturing the fuel cell stack and assembly components may be reduced and weight of the fuel cell stack may be reduced. In addition, effects that can be obtained or expected from exemplary embodiments of the present invention are directly or suggestively described in the following detailed description. That is, various effects expected from exemplary embodiments of the present invention will be described in the following detailed description.

BRIEF DESCRIPTION OF THE DRAWINGS

The drawings are provided for reference in describing exemplary embodiments of the present invention and the spirit of the present invention should not be construed only by the accompanying drawings.

DETAILED DESCRIPTION

Figure 1:
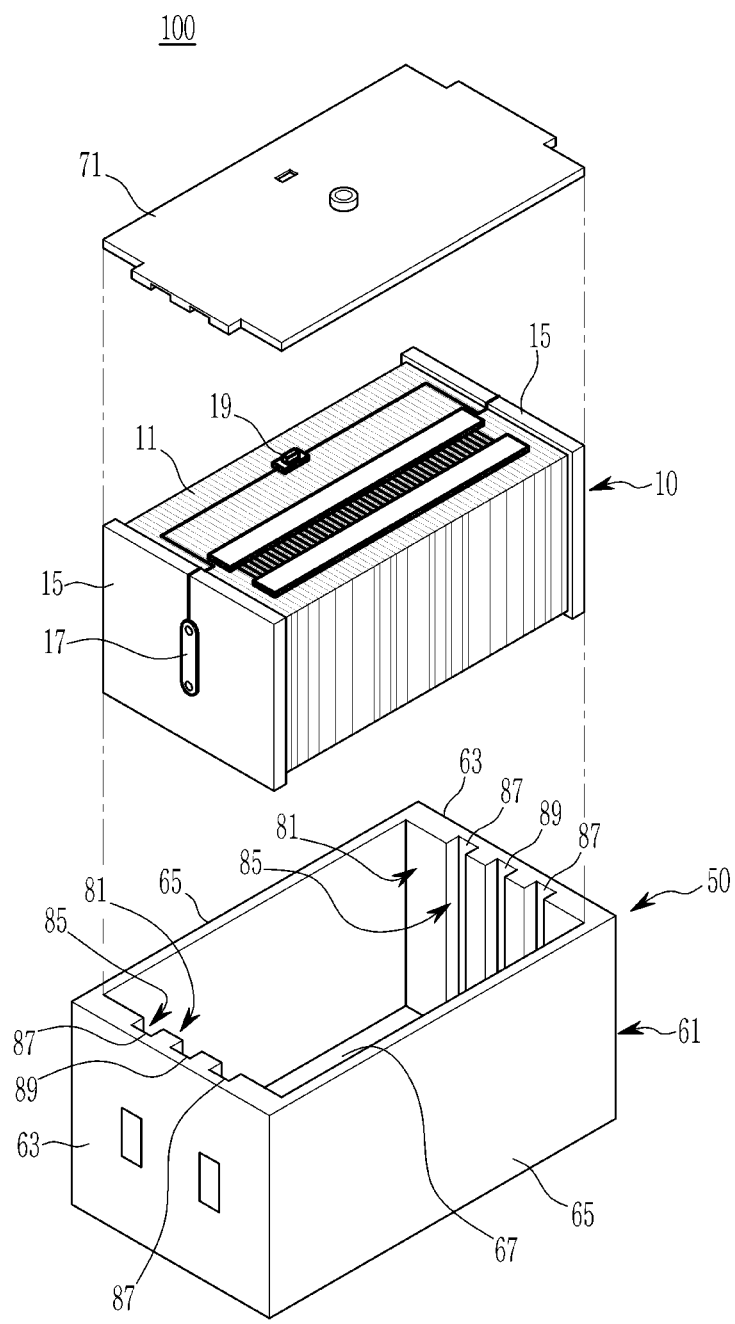
FIG. 1 is a detailed perspective view illustrating a fuel cell stack according to an exemplary embodiment of the present invention.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The present invention will be described more fully hereinafter with reference to the accompanying drawings, in which exemplary embodiments of the invention are shown. As those skilled in the art would realize, the described embodiments may be modified in various different ways, all without departing from the spirit or scope of the present invention. In order to clarify the present invention, parts that are not connected with the description will be omitted, and the same elements or equivalents are referred to as the same reference numerals throughout the specification.

The size and thickness of each element are arbitrarily shown in the drawings, and the present invention is not necessarily limited thereto, and in the drawings, the thickness of layers, films, panels, regions, etc., are exaggerated for clarity. Further, in the following detailed description, names of constituent elements, which are in the same relationship, are divided into "the first", "the second", and the like, but the present invention is not limited to the order in the following description. In addition, the terminologies such as " . . . unit", " . . . means", " . . . part", or " . . . member", which are disclosed in the specification, refer to a unit of an inclusive constituent which performs at least one of the functions or operations.

Figure 2:
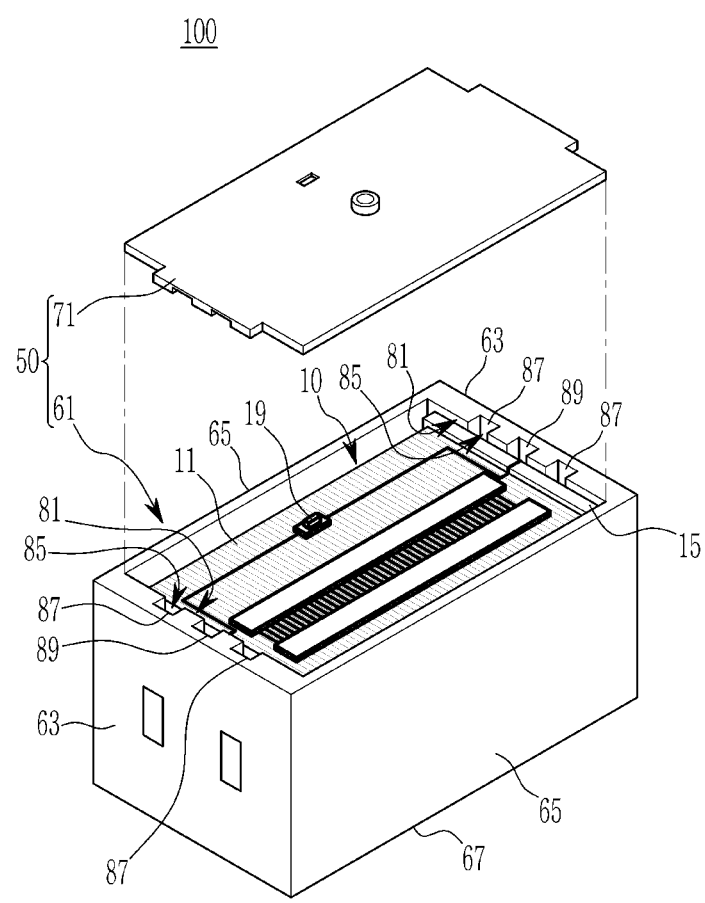
FIG. 2 is a partial detailed perspective view illustrating a fuel cell stack according to an exemplary embodiment of the present invention.
Figure 3:
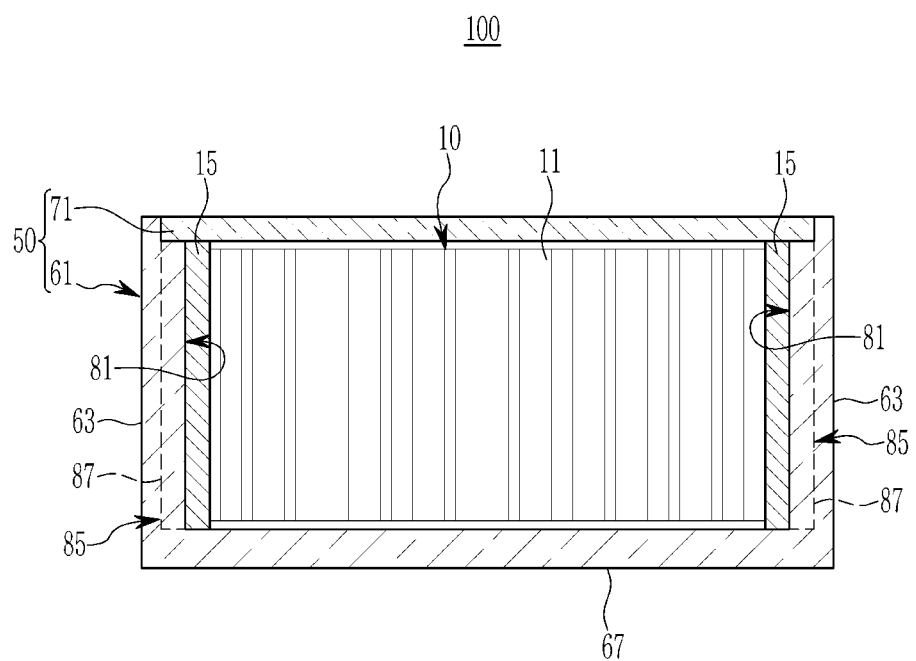
FIG. 3 is a cross-sectional diagram illustrating a fuel cell stack according to an exemplary embodiment of the present invention.

FIG. 1 and FIG. 2 are detailed perspective views illustrating a fuel cell stack according to an exemplary embodiment of the present invention, and FIG. 3 is a cross-sectional diagram illustrating a fuel cell stack according to an exemplary embodiment of the present invention. Referring to FIG. 1 to FIG. 3, a fuel cell stack 100 according to an exemplary embodiment of the present invention is a collective structure of unit cells generating electrical energy by electrochemical reaction between hydrogen which is a fuel and air which is oxidizer.

For example, the fuel cell stack 100 is mounted on a fuel cell vehicle and may be configured to drive a driving motor (electrical motor) by electric energy generated from electrochemical reaction between the hydrogen and the air. The fuel cell stack 100 has a structure in which a plurality of fuel cells are stacked and pressurized to be assembled. In an exemplary embodiment of the present invention, the structure of the fuel cell stack 100 for reducing the assembly processes and assembly components is provided.

Hereinafter, an example in which the fuel cell stack 100 is assembled in the upper and lower directions based on the drawings will be described below. Hereinafter, portions toward the upper side are defined to be an upper portion, an upper surface, an upper end and an upper portion, and portions toward the lower side are defined to be a lower portion, a lower surface, a lower end and a lower portion. However, the above definition of the direction is a relative meaning, and the direction may be changed according to assembly direction of the fuel cell stack 100 and reference position, therefore the above direction is not definitely limited to the reference direction of the exemplary embodiment of the present invention.

The fuel cell stack 100 according to an exemplary embodiment of the present invention may include a fuel cell assembly 10 and an enclosure 50. The fuel cell assembly 10 may include a plurality of fuel cells 11 and a current collector 15 disposed at upper and lower sides of the fuel cell assembly 10 with the fuel cells 11 interposed therebetween. The fuel cell 11 has a unit cell configuration in which separating plates are disposed at both sides of a membrane electrode assembly (MEA) with the MEA interposed therebetween. The current collector 15 may be configured to collect electricity generated from the fuel cells 11 and may be disposed at upper and lower sides of the fuel cells 11 with a plurality of stacked fuel cells 11 interposed therebetween, and is an end structure electrically connected with the fuel cells 11.

In particular, a plurality of passages for supplying hydrogen and air to the fuel cells 11 and for exhausting hydrogen, air, and water from the fuel cells 11 may be formed in the current collector 15. Additionally, a current collector terminal 17 electrically connected with the current collector 15 may be installed at the current collector 15. The enclosure 50 is a housing structure that encases and seals the fuel cell assembly 10 to protect the fuel cell assembly 10 and a housing structure component having functions of protection/support/insulation of the fuel cell assembly 10. For example, the enclosure 50 may be mounted on a fuel cell vehicle body. The enclosure 50 provides protection such as airtightness, water tightness, etc. for the fuel cell assembly.

Further, the enclosure 50 pressurizes and seals the fuel cell assembly 10 by a predetermined pressurizing force in a stacked direction of the fuel cells 11. The enclosure 50 pressurizes the upper and lower current collectors 15 of the fuel cell assembly 10 in a stacked direction of the fuel cells 11, and supports pressurizing reaction force being applied to the stacked direction of the fuel cells 11 of the fuel cell assembly 10. In other words, the enclosure 50 has a rigidity pressurizing the fuel cell assembly 10 included inside by a predetermined pressurizing force. The upper and lower current collectors 15 may be pressurized from both sides, and force compressing the fuel cells 11 is defined as a pressurizing force. In addition, compression reaction force of the fuel cells 11 applied to the upper and lower current collectors 15, that is, force applied to the opposite direction to the pressurizing direction of the fuel cells is defined as a pressurizing reaction force.

The enclosure 50 may include a housing 61 and a cover 71 which are combined or coupled with each other to seal the fuel cell assembly 10. The housing 61 accommodates the fuel cell assembly 10 therein, and may be formed as a square body shape of which one surface is opened and the remaining surfaces are closed. Hereinafter, the opening portion of the housing 61 is referred to be as opening end (an upper end in figures). The housing 61 may include both side plates 63 of a first direction supporting the current collectors 15 by both side surfaces of the fuel cell assembly 10, both side plates 65 of a second direction connected with the both side plates 63 of the first direction and supporting the other side surfaces of the fuel cell assembly 10, and a base plate 67 connected with the both side plates 63 of one direction and the both side plates 65 of the other direction. In other words, the housing a first set of side plates 63 that support a first set of side surfaces of the fuel cell assembly and a second set of side plates 65 that support a second set of side surfaces of the fuel cell assembly. The first direction refers to a stacked direction of the fuel cells 11, and the second direction refers to a vertical direction to the stacked direction of the fuel cells 11 in XY plane.

Further, the first and second set of side surfaces of the fuel cell assembly 10 are surfaces of the fuel cell assembly 10 pressurized by a predetermined pressure by the enclosure 50. Therefore, the base plate 67 supports a lower surface of the fuel cell assembly 10 pressurized by the predetermined pressure. The upper surface of the fuel cell assembly 10 pressurized by the predetermined pressure may be exposed to the opening end of the housing 61. A terminal block 19 may be connected with the current collector terminal 17 of the current collector 15 as described above.

In addition, the housing 61 may include a cathode oxygen depletion (COD) heater, a manifold block connected with a manifold of the fuel cell assembly 10, and a bus bar electrically connected with the terminal block 19 etc. The COD heater, the manifold block, and the bus bar are widely known in the art, and thus, a detailed description thereof will be omitted. The housing 61 may further include mounting means such as a plate, a block, a collar etc. to mount surrounding components such as the COD heater, the manifold block, and the bus bar etc. The attachment elements and the mounting means are used to mount the surrounding components on the housing 61 and the housing 61 on a vehicle body. Therefore, the attachment elements and the mounting means are referred to as the housing 61 except for extraordinary cases in the exemplary embodiment of the present invention. The cover 71 closes the opening end of the housing 61 in which the fuel cell assembly 10 is mounted, and may be coupled to the opening end of the housing 61. In other words, the cover 71 may accommodate the fuel cell assembly 10 therein, and may be coupled to the opening end of the housing 61 pressurizing the fuel cell assembly 10.

Hereinafter, an assembly structure of the fuel cell assembly 10 will be described in more detail. In an exemplary embodiment of the present invention, the fuel cells 11 may be stacked between an upper and lower current collectors 15, and the fuel cell assembly 10 of the fuel cells 11 and the current collectors 15 may be inserted into the housing 61 through the opening end of the housing 61 when the current collectors 15 are pressurized by a pressing mechanism from both sides in a stacked direction of the fuel cells 11.

Particularly, the fuel cell assembly 10 may be inserted into the housing 61 through the opening end of the housing 61 in a vertical surface direction to the stacked direction of the fuel cells 11. The vertical surface direction to the stacked direction of the fuel cells 11 refers to a direction at which the lower surface of the pressurized fuel cell assembly 10 is disposed on the base plate 67. The base plate 67 supports a surface of insertion direction of the fuel cell assembly 10.

Moreover, in an exemplary embodiment of the present invention, pressure of the press mechanism may be eliminated when the fuel cell assembly 10 pressurized by the press mechanism is inserted into the housing 61 in the vertical surface direction to the stacked direction of the fuel cells. Then, both side plates 63 of the first direction of the housing 61 supports the current collector 15 of the fuel cell assembly 10, and supports the pressurizing reaction force of the fuel cell assembly 10. In other words, both side plates 63 of the first direction pressurize the fuel cell assembly 10 in the stacked direction of the fuel cells 11, and support the current collector 15 on which the pressurizing reaction force of the fuel cell assembly 10 is applied.

The press mechanism include a press fork 91 (hereinafter, it is referred to FIG. 4) configured to pressurize the current collector 15 with the fuel cells 11 interposed therebetween. The press fork 91 may be provided as a pair at both sides of the fuel cell assembly 10, and may be formed to be a fork shape having a predetermined thickness and configured to pressurize the surface that supports the current collector 15. The press fork 91 may be formed as one arm cantilever shape having a first side as a fixed end and a second side as a free end.

Further, the press fork 91 components may be configured to come into contact with each other when the pressure is applied, and may be configured to pressurize the current collector 15 of the fuel cell assembly 10. The components of the press fork 91 may be configured to separate from each other by the pressurizing reaction force of the fuel cell assembly 10 when the pressure is released, and may thus be configured to release the pressurizing of the fuel cell assembly 10. The both side plates 63 of first direction may include an inside supporting surface 81 that supports the current collector 15 to which a pressurizing reaction force of the fuel cell assembly 10 is applied, and a fork guide unit 85 that allows for the release of pressure and extraction to outside of the press fork 91 may be formed at an inside surface of the both side plates 63.

The inside supporting surface 81 supports the current collector 15 of the fuel cell assembly 10 and the pressurizing reaction force of the fuel cell assembly 10 when pressurizing of the press fork 91 is released. In other words, the inside supporting surface 81 may be a pressurizing surface configured to pressurize the fuel cell assembly 10 in the housing 61 in a stacked direction of the fuel cells 11. The fork guide unit 85 may be a guide that guides the press fork 91. The fork guide unit 85 may include a plurality of fork grooves 87 formed at the inside supporting surface 81 to be connected from an opening end to a closing end of the housing 61 along the insertion direction of the fuel cell assembly 10.

The fork groove 87 may be formed such that the press fork may be inserted into the inside of the housing 61 in the stacked direction of the fuel cells 11 when pressurizing of the press fork 91 pressurizes the current collector 15 of the fuel cell assembly 10 from both sides in the housing 61. In addition, the fork groove 87 may have a width that corresponds to a width of the press fork 91 or a greater width than the width of the press fork 91, and may be formed as a greater depth than the thickness of the press fork 91. Particularly, the press fork 91 may be removed from the fork groove 87 (e.g., slid out of) and inserted into the housing 61 when the fuel cell assembly 10 is inserted into the housing 61 in a state that the fuel cell assembly 10 is pressurized. Further, a portion of the press fork 91 may be inserted into the fork groove 87, and may be inserted into the housing 61 while being guided along the fork groove 87.

As described above, when the press fork 91 is released in the housing 61, both side plates 63 of the first direction of the housing 61 support the pressurizing reaction force of the fuel cell assembly 10 through the inside supporting surface 81. Accordingly, both side plates 63 of the first direction support the pressurizing reaction force of the fuel cell assembly 10 through the inside supporting surface 81, and operate as pressurizing plates that pressurize the fuel cell assembly 10 along the stacked direction of the fuel cells 11.

Meanwhile, the cover 71 of the enclosure 50 may be coupled to the opening end of the housing 61 and may close the inside of the housing 61 in a state that the fuel cell assembly 10 is accommodated within the housing 61. In particular, both side plates 63 of the first direction of the housing 61 support the pressurizing reaction force of the fuel cell assembly 10 in a vertical direction to the closing direction of the cover 71, and may pressurize the fuel cell assembly 10 in the stacked direction of the fuel cells. In addition, in both side plates 63 of the first direction of the housing 61, the terminal groove 89 into which the current collector terminal 17 may be inserted is formed on the inside supporting surface 81. The terminal groove 89 may be formed to be parallel to the fork groove 87 and connected from the opening end to the closing end of the housing 61.

Hereinafter, an assembly method of the fuel cell stack 100 according to an exemplary embodiment of the present invention will be explained in detail with reference to figures illustrated above. FIG. 4 to FIG. 9 are drawings for explaining assembly method of a fuel cell stack according to an exemplary embodiment of the present invention.

Figure 4:
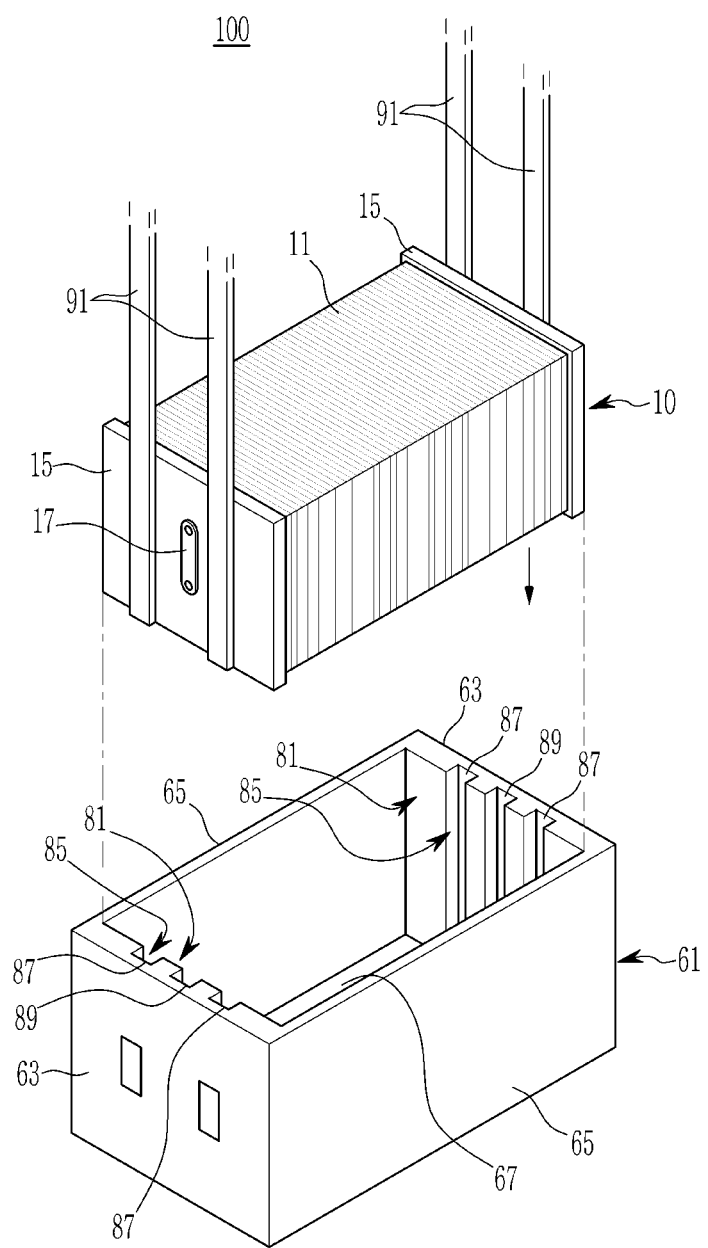
FIG. 4 to FIG. 9 are drawings illustrating assembly method of a fuel cell stack according to an exemplary embodiment of the present invention.

Referring to FIG. 4, in an exemplary embodiment of the present invention, an enclosure 50 including a housing 61 of which one surface is open and the remaining surfaces are closed and a cover 71 coupled to an opening end of the housing may be provided. In particular, both side plates 63 of a first direction of the housing 61 may include an inside supporting surface 81, and a fork groove 87 and a terminal groove 89 may be connected with the housing 61 from an opening end to a closing end at the inside supporting surface 81.

Then, in an exemplary embodiment of the present invention, fuel cells disposed between current collectors of both sides may be stacked (arranged), and the current collectors may be pressurized by a press fork 91 along the stacked direction of the fuel cells 11 at the both sides. In particular, the fuel cell assembly 10 of the current collector 15 and the fuel cells 11 pressurized by the press fork 91 inserted into the housing 61 through the opening end in a vertical direction to the stacked direction of the fuel cells 11. The fuel cell assembly 10 may be inserted into the housing 61 via the press fork 91 in a vertical surface direction of the fuel cells 11. The fuel cell assembly 10 may be compressed by a pressurizing force of the press fork 91 and may be configured to apply the compression reaction force (e.g., pressurizing reaction force) to the press fork 91.

Figure 5:
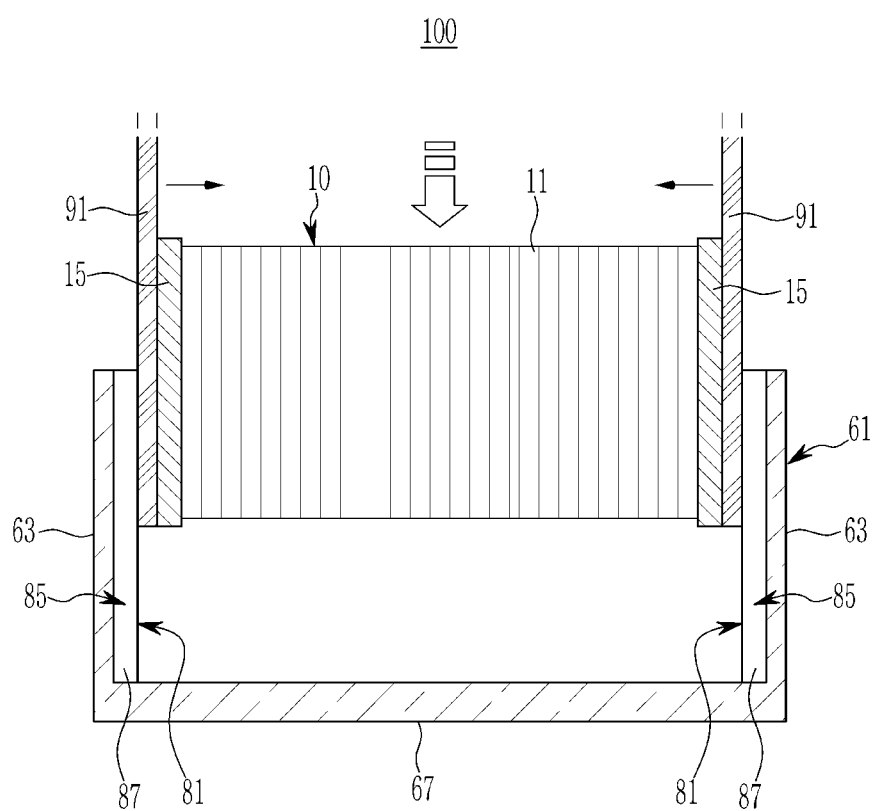
Figure 6:
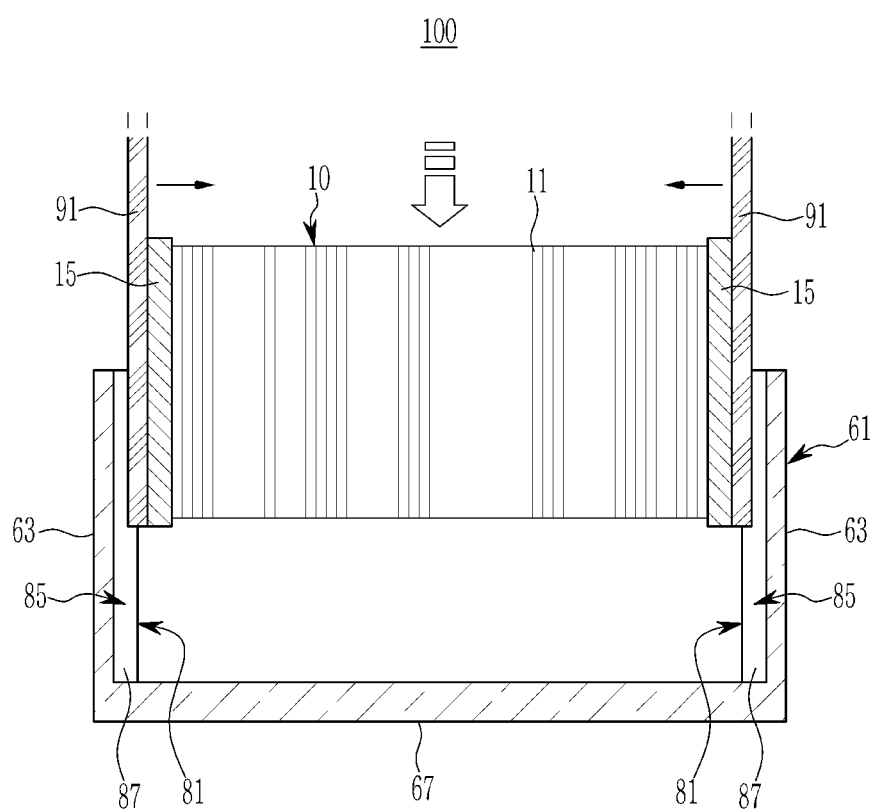
Figure 7:
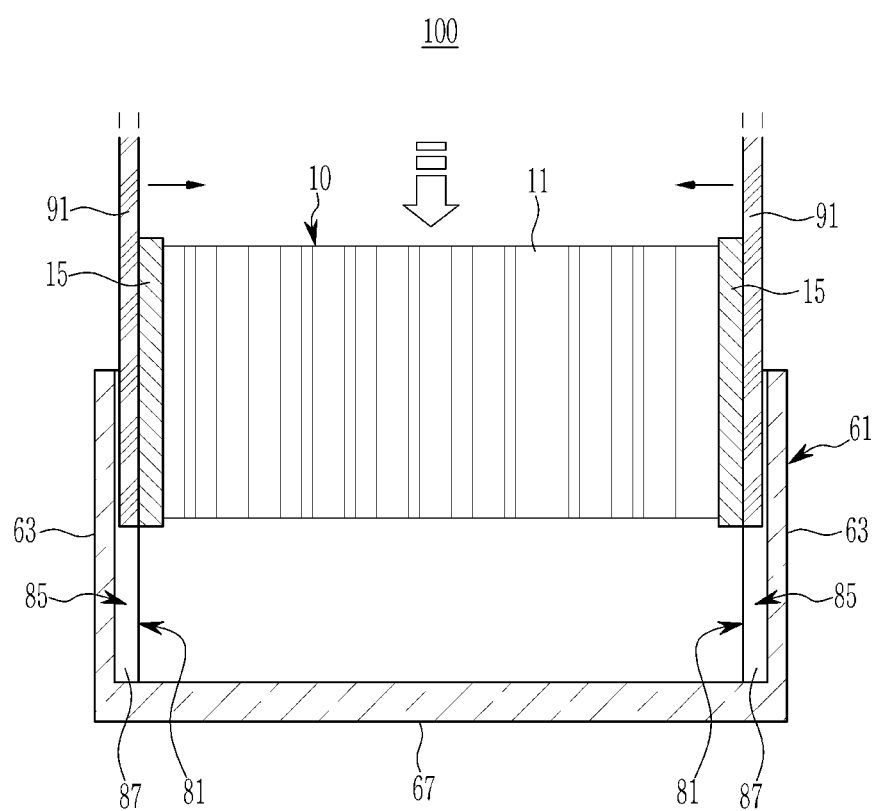

Particularly, the press fork 91 may be inserted into the housing 61 with the fuel cell assembly 10, and as illustrated in FIG. 5, the press fork 91 may be released or slid out of the fork groove 87 of both side plates 63 of the first direction and inserted into the housing 61. Further, as illustrated in FIG. 6, the press fork 91 may be inserted into the fork groove 87 to the extent of a portion of thickness along the stacked direction of the fuel cells 11, and may be inserted into the housing 61. As illustrated in FIG. 7, the press fork 91 may be inserted into the fork groove 87 to the extent of an entire thickness along the stacked direction of the fuel cells 11, and may be inserted into the housing 61.

Figure 8:
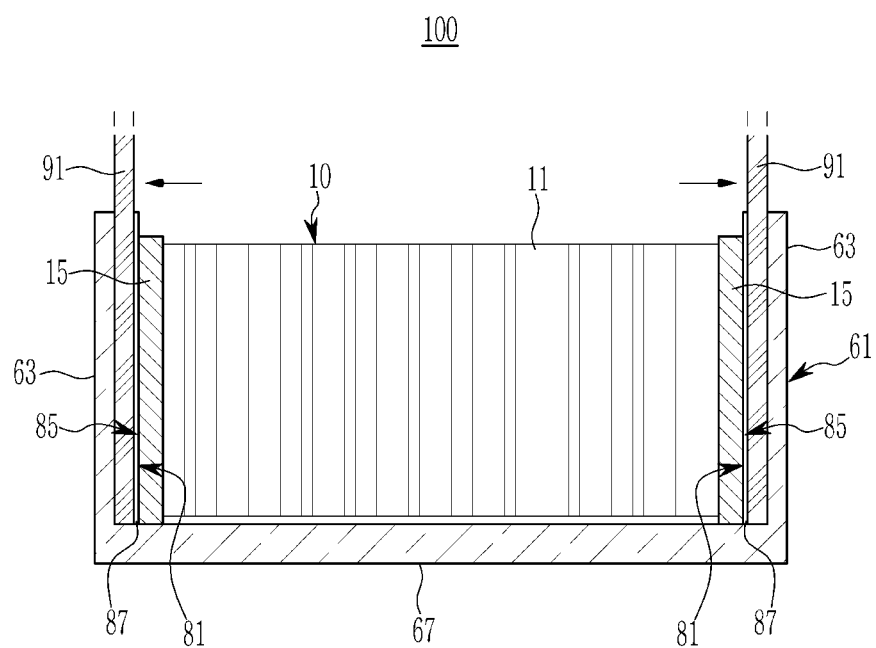

Furthermore, the current collector 15 may be pressurized by a greater pressurizing force than a predetermined pressurizing force through the press fork 91. Accordingly, the state in which the fuel cell assembly 10 is pressurized by the predetermined pressurizing force may be maintained when the press fork 91 releases the pressure. The pressurizing of the press fork 91 may be released in the housing 61 and the press fork 91 may move to be released by the pressurizing reaction force of the fuel cell assembly 10, and the pressurizing of the fuel cell assembly 10 may be released. In particular, as illustrated in FIG. 8, the press fork 91 may be inserted into the fork groove 87 of both side plates 63 of the first direction in the housing 61 in the stacked direction of the fuel cells 11. In this process, the current collector terminal 17 of the current collector 15 may be inserted into the terminal groove 89 of both side plates 63.

Accordingly, both side plates 63 of the housing 61 support the pressurizing reaction force of the fuel cell assembly 10 through the inside supporting surface 81. The inside supporting surface 81 of both side plates 63 supports the current collector 15, and may support the pressurizing reaction force of the fuel cell assembly 10. Accordingly, in an exemplary embodiment of the present invention, the fuel cell assembly 10 may be pressurized by the predetermined pressurizing force through the both side plates 63 in the stacked direction of the fuel cells.

Figure 9:
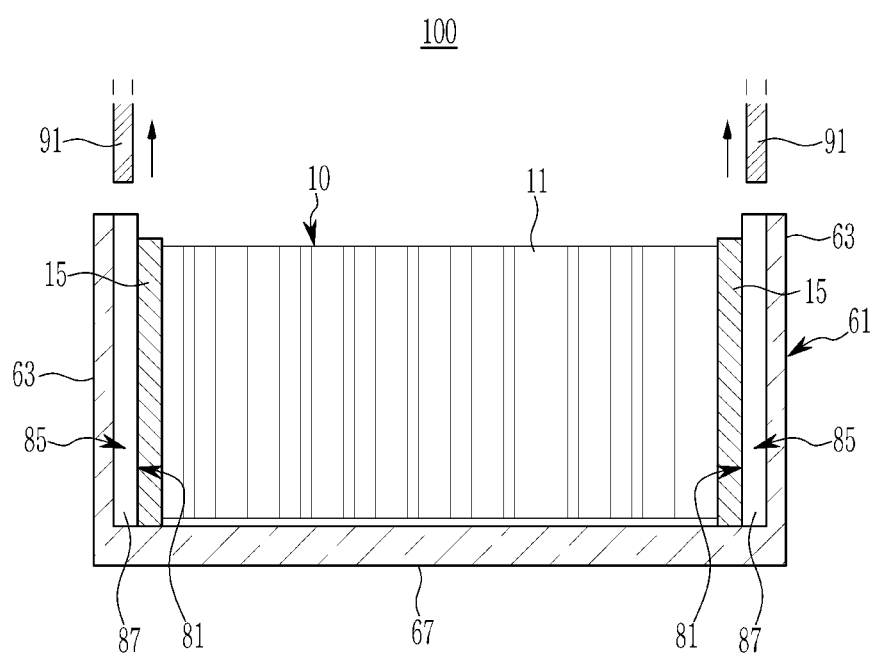

Further, as illustrated in FIG. 9, the press fork 91 may be extracted to an outside (e.g., out of the housing) through the fork groove 87 of the inside supporting surface 81, and the cover 71 may be coupled to the opening end of the housing in a state that components such as the terminal block 19 are mounted on the fuel cell assembly 10. Accordingly, the assembly of the fuel cell stack 100 according to the exemplary embodiment of the present invention is completed. In particular, both side plates 63 of the housing 61 support the pressurizing reaction force of the fuel cell assembly 10 in a vertical direction to the closing direction of the cover 71, and the fuel cell assembly 10 may be pressurized in the stacked direction of the fuel cells.

According to the fuel cell stack 100 and assembly method thereof according to an exemplary embodiment of the present invention, the fuel cell stack 100 in which the fuel cell assembly 10 is pressurized and combined by a predetermined pressurizing force by using an enclosure 50 that seals the fuel cell assembly 10 may be provided. Accordingly, in an exemplary embodiment of the present invention, fasteners for pressurizing and fastening the fuel cells such as an end plate, a fastening band, a bolt rod and a nut may be omitted. Accordingly, in an exemplary embodiment of the present invention, the entire assembly processes for manufacturing the fuel cell stack 100 and assembly components may be reduced and weight of the fuel cell stack may be reduced.

While this invention has been described in connection with what is presently considered to be exemplary embodiments, it is to be understood that the invention is not limited to the disclosed embodiments, but, on the contrary, is intended to cover various modifications and equivalent arrangements included within the spirit and scope of the appended claims.

DESCRIPTION OF SYMBOLS

10: fuel cell assembly
11: fuel cell
15: current collector
17: current collector terminal
19: terminal block
50: enclosure
61: housing
63: both side plate of a first direction
65: both side plate of a second direction
67: base plate
71: cover
81: inside supporting surface
85: fork guide unit
87: fork groove
89: terminal groove
91: press fork

What is claimed is:

1. A fuel cell stack, comprising:
an enclosure having a housing and a cover which are coupled with each other; and
a fuel cell assembly in which a plurality of stacked fuel cells are pressurized by a predetermined pressure along a stacked direction in the housing,
wherein the cover closes inside of the housing, and
wherein the housing supports a pressurizing reaction force of the fuel cell assembly in a vertical direction to a closing direction of the cover,
wherein the housing has an opening end to which the cover is coupled, and the fuel cell assembly is inserted into the housing in a vertical surface direction to the stacked direction of the fuel cells through the opening end in a state that the fuel cell assembly is pressurized by a press fork along the stacked direction of the fuel cells.

2. The fuel cell stack of claim 1, wherein the housing includes both side plates supporting the pressurizing reaction force of the fuel cell assembly, and a plurality of fork grooves that allow a release of pressurizing and an extraction to outside of the press fork, wherein the fork grooves are disposed at an inside surface of the both side plates.

3. The fuel cell stack of claim 2, wherein each of the plurality of fork grooves is formed to be connected from the opening end to a closing end of the housing along an insertion direction of the fuel cell assembly, and the press fork formed as one arm cantilever shape pressurizing the fuel cell assembly to be inserted into the inside of the housing in the stacked direction of the fuel cells.

4. A fuel cell stack, comprising:
a fuel cell assembly in which a plurality of fuel cells are stacked between upper and lower current collectors, and an enclosure that pressurizes and seals the fuel cell assembly in a stacked direction of the fuel cells, wherein the enclosure includes a housing in which one surface is open, and a cover that closes an opening end of the housing, wherein the fuel cell assembly is inserted into the housing through the opening end in a surface direction vertical to the stacked direction of the fuel cells, wherein the fuel cell assembly is inserted into the housing in a state of being pressurized by a press fork, and a fork guide unit is formed at an inside supporting surface of both side plates of a first direction and allows a release of pressurizing and an extraction of the press fork, and wherein the housing includes:

the both side plates of the first direction supporting the current collectors by a first set of side surfaces of the fuel cell assembly and supporting pressurizing reaction force of the fuel cell assembly;

both side plates of a second direction connected with the both side plates of the first direction and supporting a second set of side surfaces of the fuel cell assembly; and a base plate connected with the both side plates of the first direction and the both side plates of the second direction and supporting a surface of an insertion direction of the fuel cell assembly.

5. The fuel cell stack of claim 1, wherein the both side plates of the first direction include:

the inside supporting surface that supports the current collector to which a pressurizing reaction force of the fuel cell assembly is applied; and a plurality of fork grooves formed at the inside supporting surface to be connected from the opening end to a closing end of the housing along the insertion direction of the fuel cell assembly.

6. The fuel cell stack of claim 5, wherein each of the plurality of fork grooves is formed to have a greater depth than a thickness of the press fork.

7. The fuel cell stack of claim 5, wherein the press fork is formed as one arm cantilever shape that pressurizes the current collector at both sides and is to be inserted into the inside of the housing in the stacked direction of the fuel cells.

8. The fuel cell stack of claim 5, wherein a current collector terminal is installed at each of the upper and lower current collectors, and a terminal groove is formed at the inside supporting surface and parallel to one of the plurality of fork grooves and into which the current collector terminal is inserted.

* * * * *